April 10, 1956 R. G. PIERCE 2,741,035
DEVICE FOR USE IN MEASURING PITCH DIAMETERS OF THREADS
Filed March 12, 1953
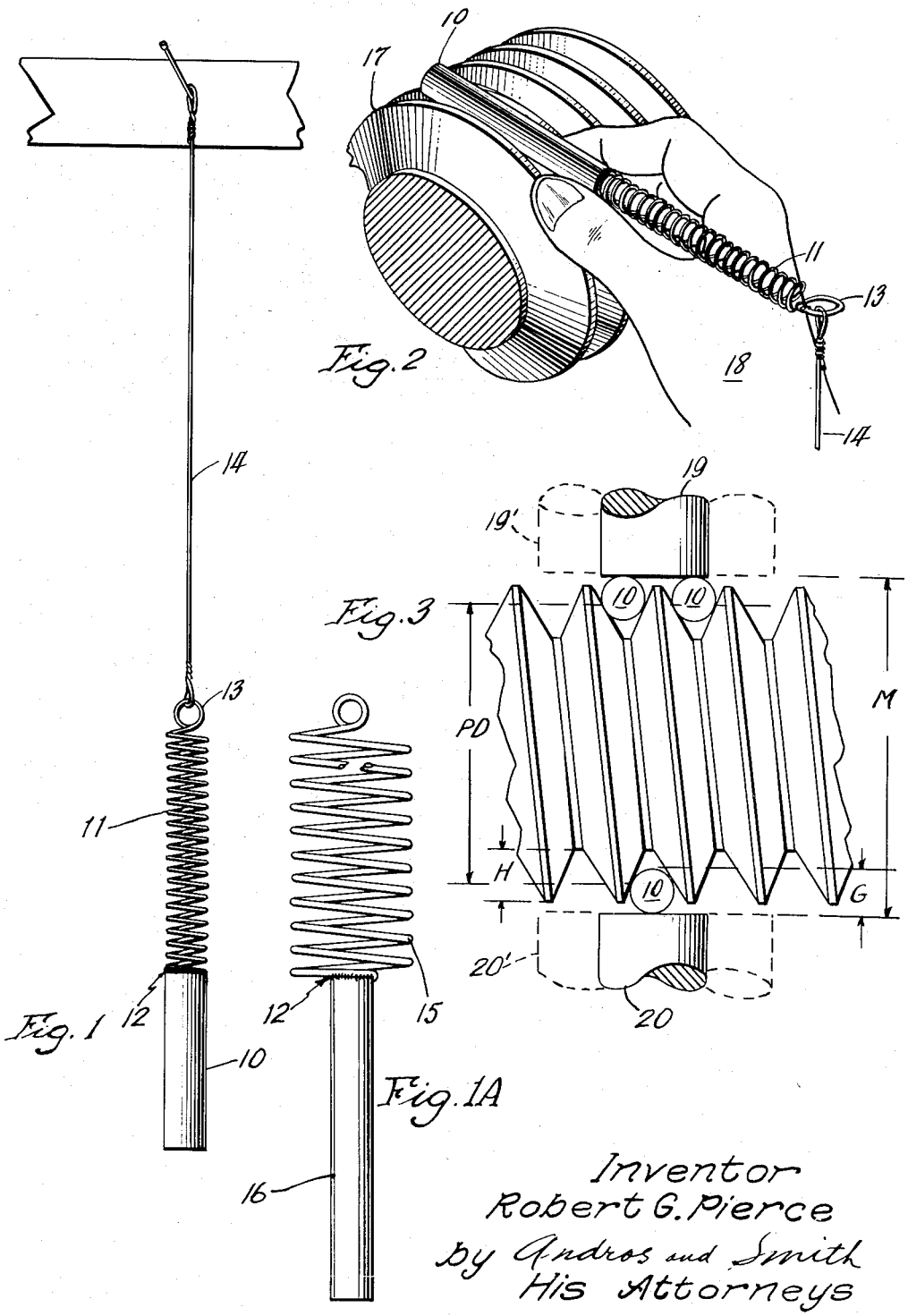
Inventor
Robert G. Pierce
by Andros and Smith
His Attorneys

United States Patent Office 2,741,035
Patented Apr. 10, 1956

2,741,035

DEVICE FOR USE IN MEASURING PITCH DIAMETERS OF THREADS

Robert G. Pierce, Oak Park, Ill.

Application March 12, 1953, Serial No. 341,928

5 Claims. (Cl. 33—199)

This invention relates to a device for use in measuring threads, having particular reference to a tungsten carbide type of thread measuring wire of precise and relatively small diameter for use in measuring pitch diameters of threads, the wire being provided with an elongated resilient holder affixed to one end thereof, and the provision of such a device is the principal object of the invention.

Tungsten carbide is a very costly material. It is difficult to work or grind on lapping machines over long lengths into thread measuring wires to exact size, is very brittle and breaks easily. All this adds materially to the cost of producing such wires which, when finished, are exceedingly expensive. These wires are held to the exact "best wire" size, within the Bureau of Standards specifications of roundness, straightness and diameter of .000025" in the middle of the wires. The lap-grinding method developed in connection with such wires is responsible for this accuracy in "best wire" sizes, thereby eliminating refiguring of formulae. These wires are ground and lapped to an accuracy in roundness and taper of .000005". This grinding operation eliminates waviness and bent sections. Such wires, of course, are often very small, the smallest in fact being only .007". They are often dropped and lost, or misplaced, and when laid down during use, or left lying around, become unclean. It is bothersome, time-consuming and otherwise uneconomical constantly to remove and replace them in the tubes or containers in which they are shipped and received, and they are otherwise difficult to handle.

It has long been recognized that it would be a distinct improvement to overcome the foregoing difficulties and disadvantages and this has now been accomplished by means of the present invention.

More specifically, it is an object of the invention to provide such expensive wires as tungsten carbide with a co-axial helical spring, preferably of copper, and of relatively larger diameter, secured to one end thereof, the spring having an eye at its free end adapted to receive a hanging means so that the same can be suspended in an out of the way, yet readily available position to keep it clean and prevent it from being lost.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 illustrates a preferred embodiment of the invention;

Fig. 1A illustrates a modified embodiment;

Fig. 2 is a perspective view, enlarged in part for purposes of illustration, depicting the use of the invention; and Fig. 3 is an elevational view, also enlarged for clarity in illustration, further showing the use of the device.

Referring more particularly to the drawing there is shown an enlarged thread measuring wire 10 preferably made of such material as tungsten carbide. Secured to one end thereof and co-axial therewith is a helical spring 11 preferably made of copper. The spring is secured to the wire, for example, by a suitable resin cement as indicated at 12. At the free end of the spring 11 is an eye 13 adapted to receive a hanging means such as a thread 14 so that the same can be suspended in an out of the way, yet readily available position.

In Fig. 1 the spring has been shown as being of approximately the same diameter as the thread measuring wire, but it should be understood that this is for purposes of illustration merely. Actually, for convenience in handling, the spring may be relatively larger as shown at 15 in Fig. 1A and the measuring wire 10 may be relatively longer as shown at 16.

In Fig. 2 there is shown very much enlarged a portion of a worm 17 and the placement in the pitch of the thread of the measuring wire 10. Obviously the illustration of the hand 18 holding the wire in position is relatively smaller, but again this is for purposes of illustration.

In Fig. 3 it will be seen that preferably two of such thread measuring wires at 10 are placed and held in the top of the thread and one of such wires is held in the bottom of the thread. When so positioned these wires and threads are brought between the top and bottom anvils 19 and 20 of a micrometer. It will be observed that the anvils are also indicated as being somewhat enlarged as shown by the dotted lines 19' and 20'.

The pitch diameter can then readily be calculated from the known size of the thread measuring wire 10 by use of the following formula, for example, a U. S. Standard 60° thread:

$$PD = M - (3G - H)$$

in which:

$M$ = distance between anvils 19 and 20,
$G$ = diameter of wire 10, and
$H$ = depth of the V thread.

Since certain changes may be made in the above device and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A cylindrical thread measuring wire of precise diameter formed of tungsten carbide having a holder of substantially greater length cemented to one end thereof comprising a helical spring for suspending the same in elevated position when said wire is out of use.

2. The structure set forth in claim 1 in which the spring is formed of copper.

3. A thread measuring wire of precise but relatively small diameter formed of tungsten carbide and forming a solid cylinder throughout its length having an elongated flexible holder of substantially greater length cemented to one end thereof having an outside diameter that is relatively larger than the diameter of said wire; whereby said wire can be suspended in elevated position when the same is out of use.

4. The structure set forth in claim 3 in which the holder is formed of copper.

5. The structure set forth in claim 3 in which said holder has an eye at the free end thereof adapted to receive a hanging means.

References Cited in the file of this patent

UNITED STATES PATENTS

| | | |
|---|---|---|
| 272,472 | Post | Feb. 20, 1883 |
| 901,452 | Kunde | Oct. 20, 1908 |
| 2,223,783 | Fletcher | Dec. 3, 1940 |
| 2,360,058 | Hohwart | Oct. 10, 1944 |
| 2,399,624 | Bunch | May 7, 1946 |
| 2,466,490 | Simmons | Apr. 5, 1949 |
| 2,554,024 | Govoni | May 22, 1951 |
| 2,622,337 | Ross | Dec. 23, 1952 |
| 2,677,189 | Wiles | May 4, 1954 |

FOREIGN PATENTS

| | | |
|---|---|---|
| 970,113 | France | Dec. 29, 1950 |
| 998,719 | France | Jan. 22, 1952 |

OTHER REFERENCES

Chapman: Publication in Popular Science, April 1944, page 172. Copy in Library.